United States Patent [19]

Good

[11] Patent Number: 5,036,711
[45] Date of Patent: Aug. 6, 1991

[54] AVERAGING PITOT TUBE

[75] Inventor: James E. Good, Louisville, Colo.

[73] Assignee: Fred P. Good, Boulder, Colo.

[21] Appl. No.: 402,913

[22] Filed: Sep. 5, 1989

[51] Int. Cl.⁵ .............................................. G01F 1/46
[52] U.S. Cl. ................................................. 73/861.66
[58] Field of Search ........... 73/861.42, 861.47, 861.65, 73/861.66, 861.67

[56] References Cited

U.S. PATENT DOCUMENTS

| | | |
|---|---|---|
| 1,250,238 | 12/1917 | Spitzglass . |
| 1,428,780 | 9/1922 | Jaray . |
| 1,508,017 | 12/1922 | Greve . |
| 2,522,574 | 9/1950 | Hagenbuch . |
| 3,355,946 | 12/1967 | Lazell . |
| 3,751,982 | 8/1973 | Lambert ........................... 73/861.66 |
| 4,154,100 | 5/1979 | Harbaugh et al. . |
| 4,304,137 | 12/1981 | Mott . |
| 4,343,195 | 8/1982 | Victor et al. . |
| 4,425,807 | 1/1984 | Victor . |
| 4,466,290 | 8/1984 | Frick ............................. 73/861.47 X |
| 4,516,425 | 5/1985 | Chollet et al. ................ 73/861.65 X |
| 4,694,702 | 9/1987 | Amemori et al. ................. 73/861.24 |
| 4,717,159 | 1/1988 | Alston et al. . |

FOREIGN PATENT DOCUMENTS 1168659 4/1964 Fed. Rep. of Germany .
2032118 4/1980 United Kingdom ............. 73/861.66

Primary Examiner—Herbert Goldstein
Attorney, Agent, or Firm—Gregg I. Anderson

[57] ABSTRACT

An averaging pitot tube for measuring fluid flow in a pipe or conduit, is disclosed, including an integral head connected by a transition to a sensing tube or probe. The probe is insertable through the conduit or pipe in which fluid flow occurs to measure an upstream high pressure and a downstream low pressure. Upstream holes are formed in the probe to communicate high pressure into a high pressure chamber in the probe. Downstream holes are also formed in the probe to communicate a low pressure into a low pressure chamber in the probe. Valves placed in the integral head selectively open and close the high and low pressure passageways that communicate with the high and low pressure chambers. A measurement device is selectively connectable to the integral head and is in fluid communication with said high and low pressure passageways to make measurements of flow dependent upon the difference between the high and low pressure. Tube fittings placed in the head are disclosed for reducing leaks in the system.

14 Claims, 7 Drawing Sheets

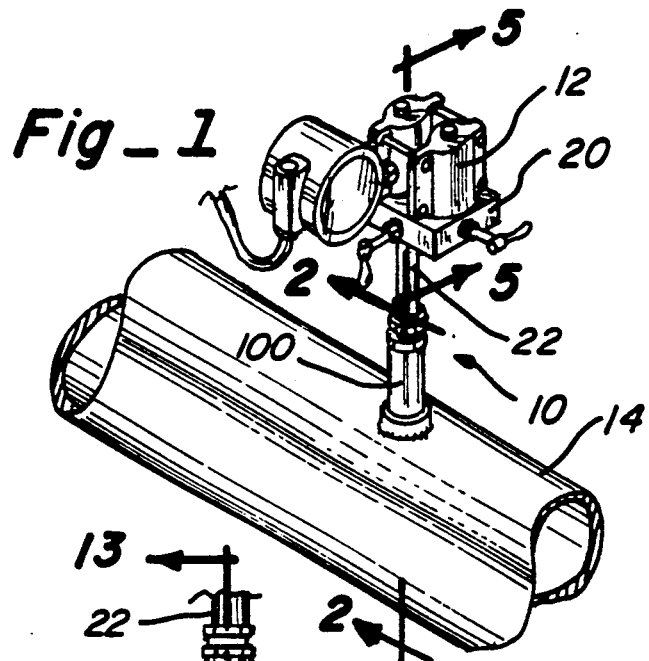
Fig_1
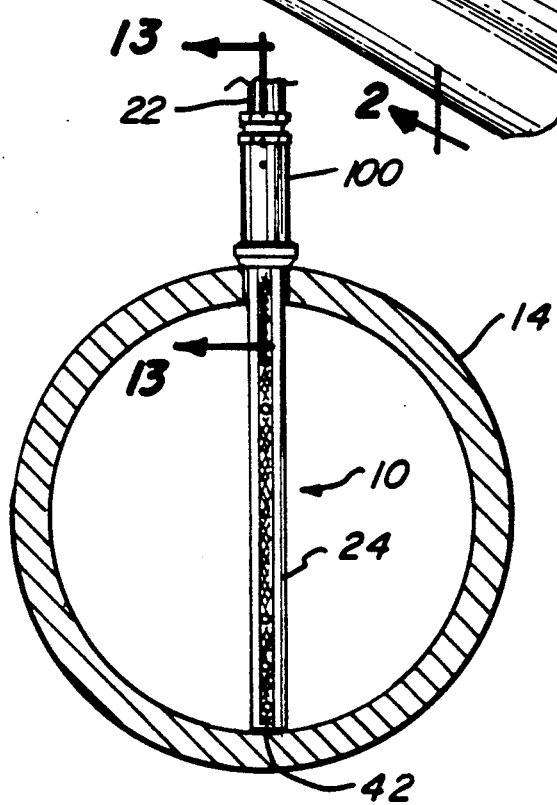
Fig_2
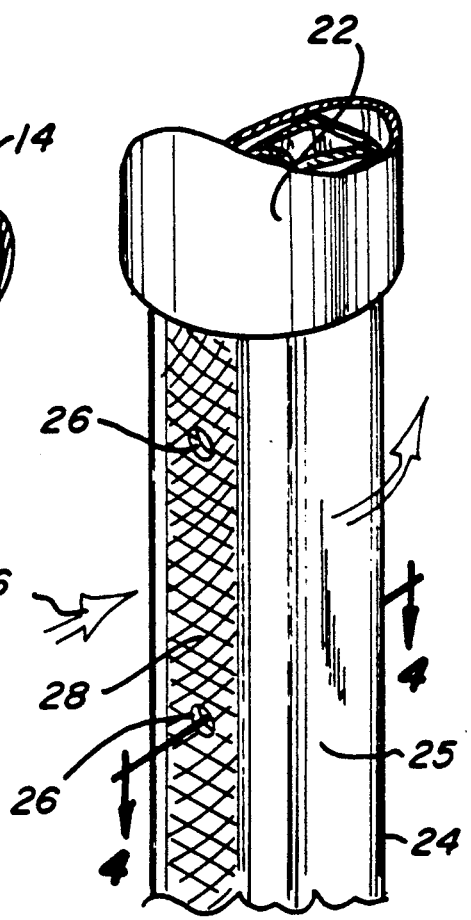
Fig_3
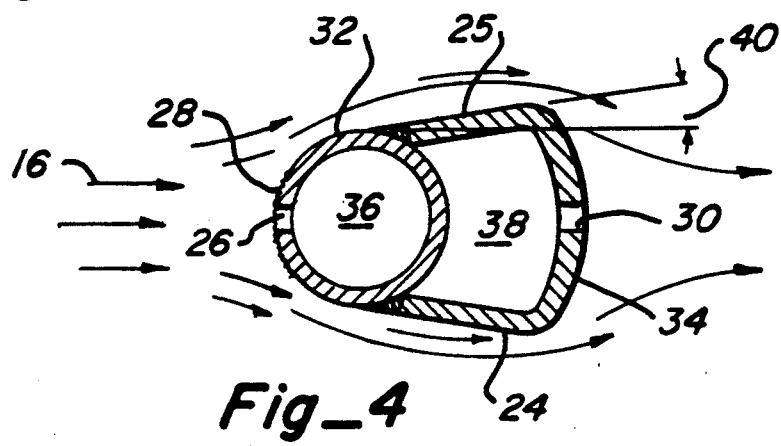
Fig_4

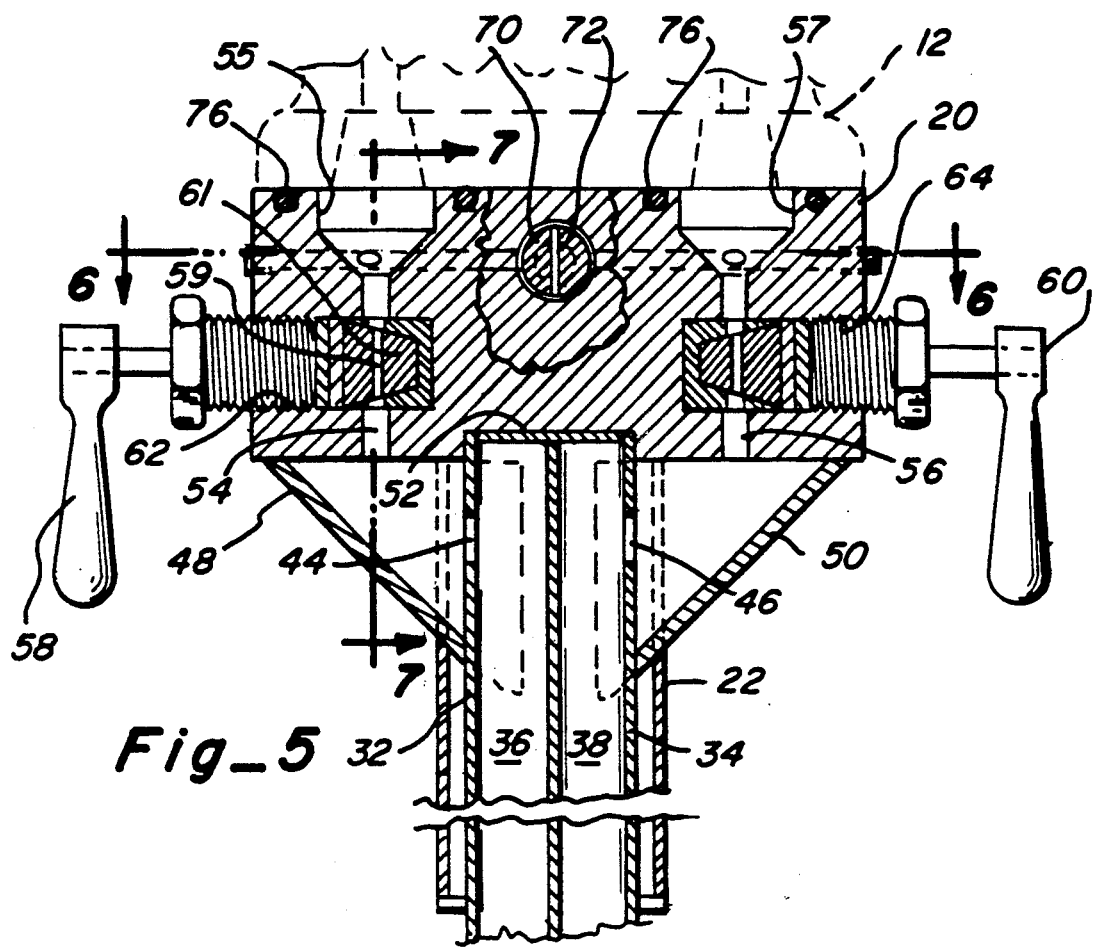
Fig_5
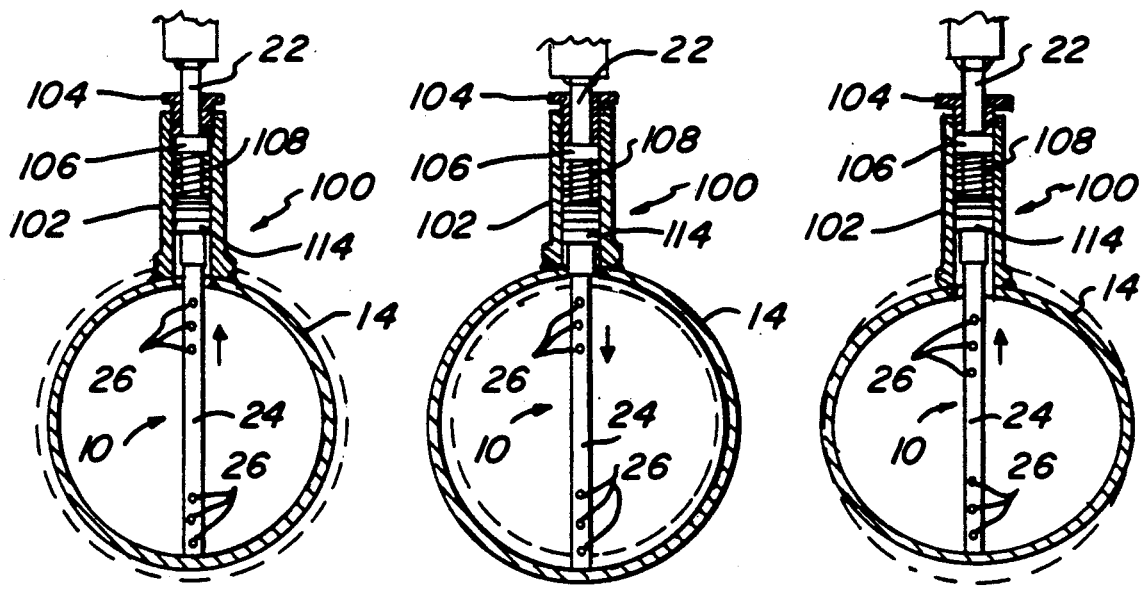
Fig_15A  Fig_15B  Fig_15C

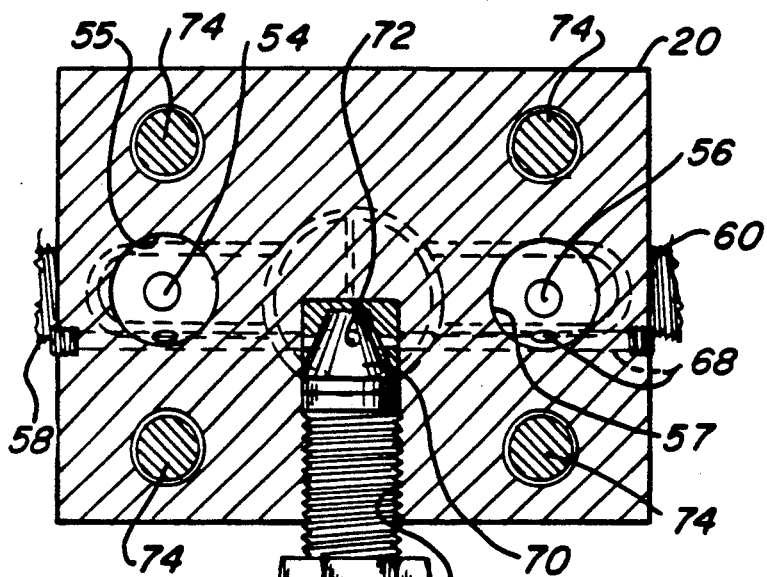
Fig_6
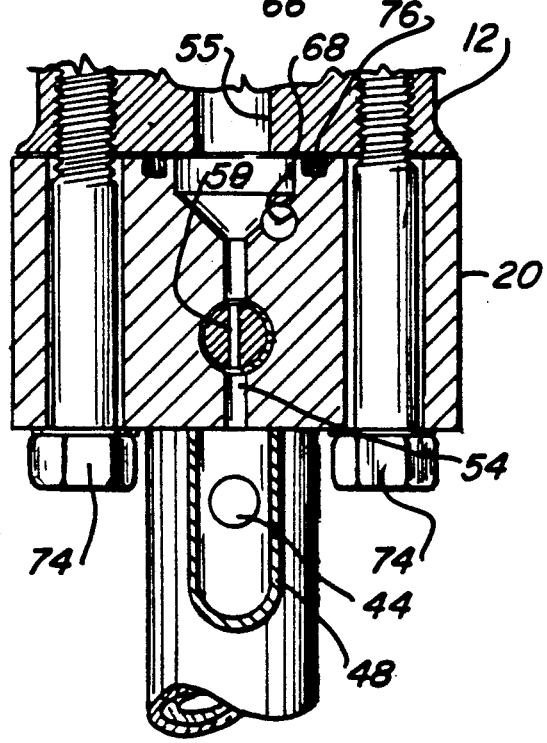
Fig_7
Fig_8
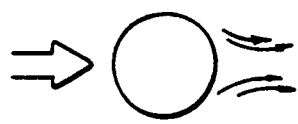
Fig_9
Fig_10
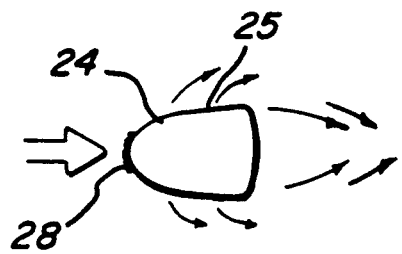
Fig_11
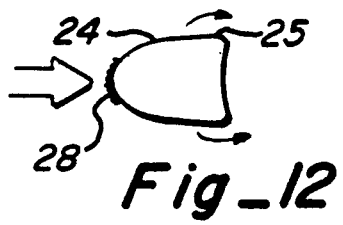
Fig_12

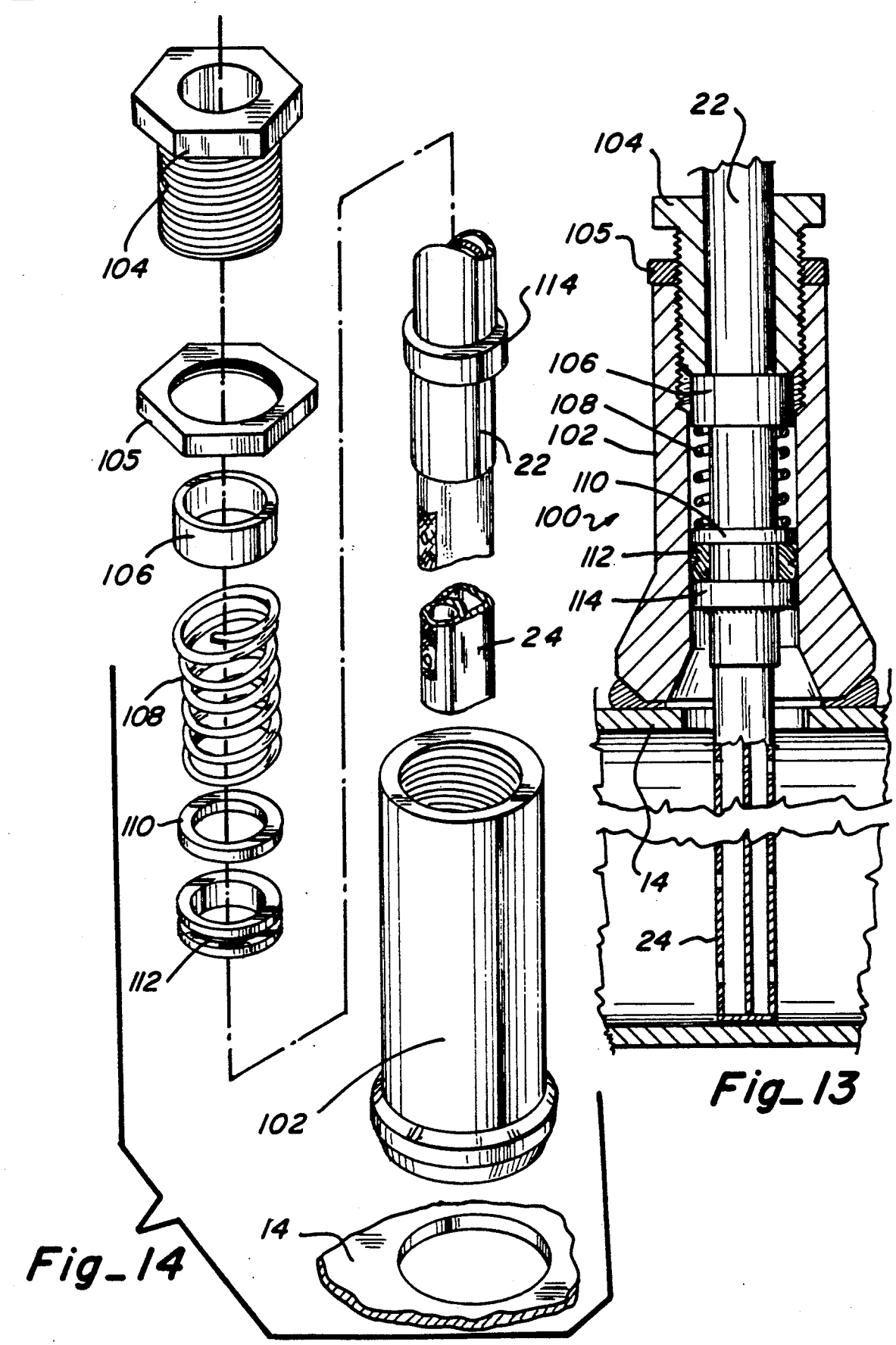
Fig_14
Fig_13

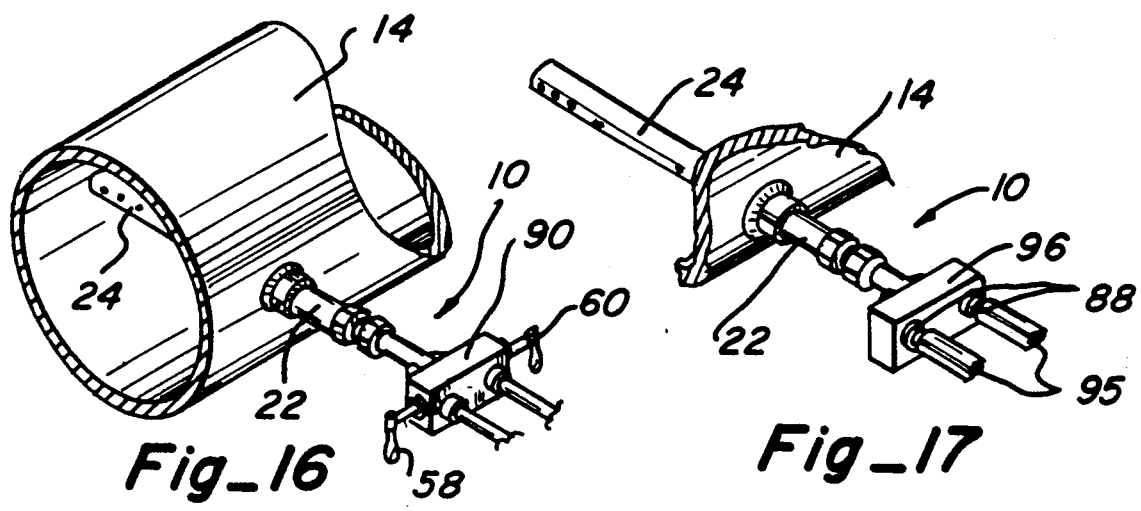
Fig_16  Fig_17
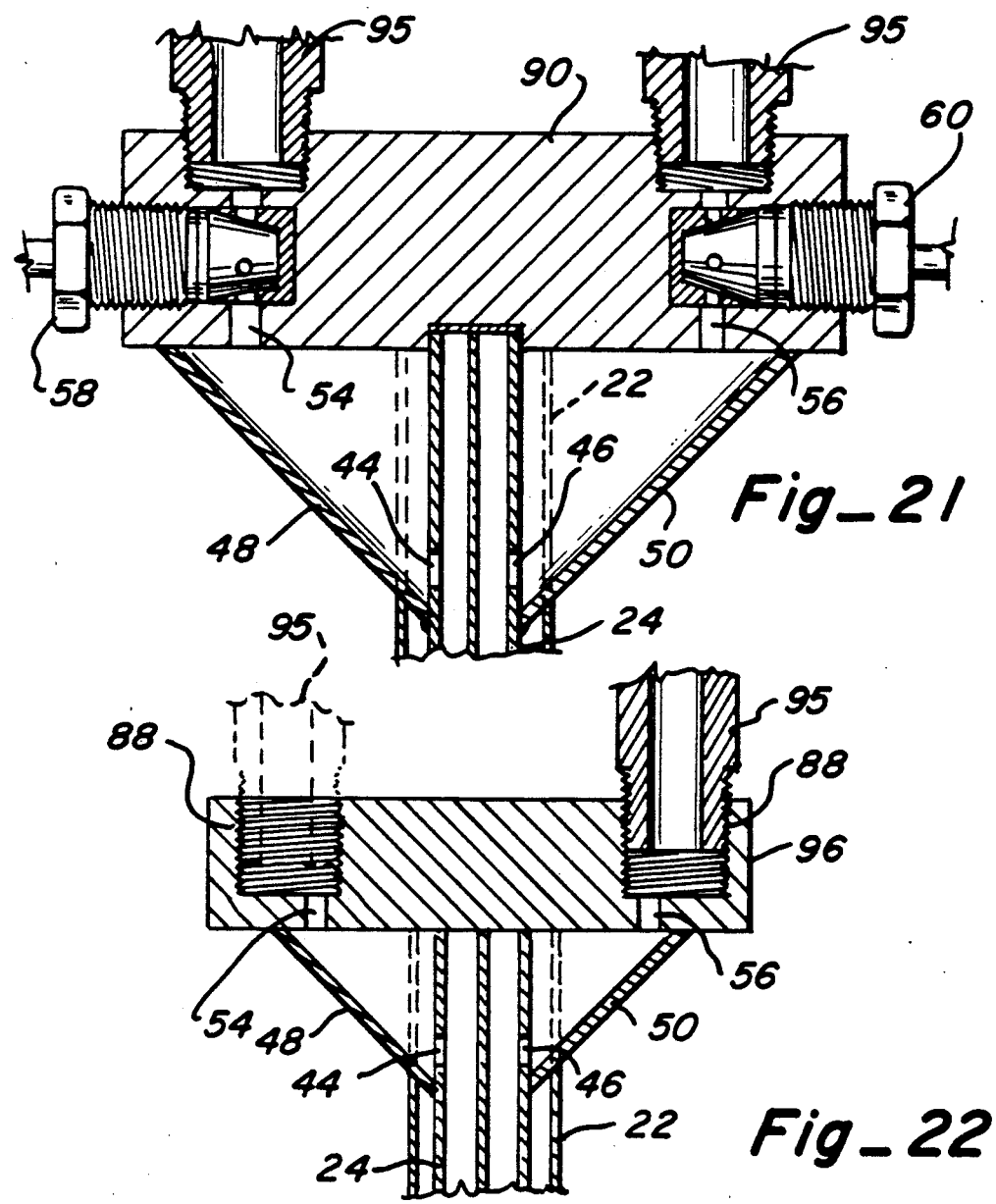
Fig_21
Fig_22

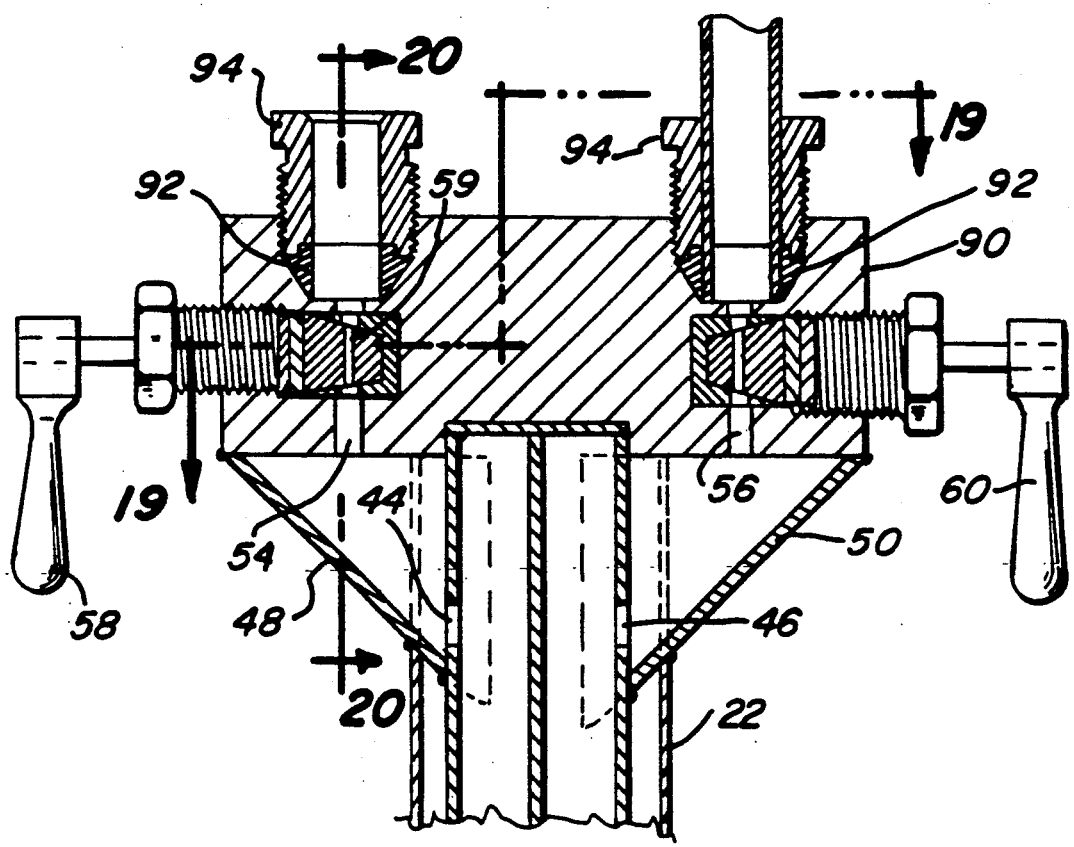
Fig_18
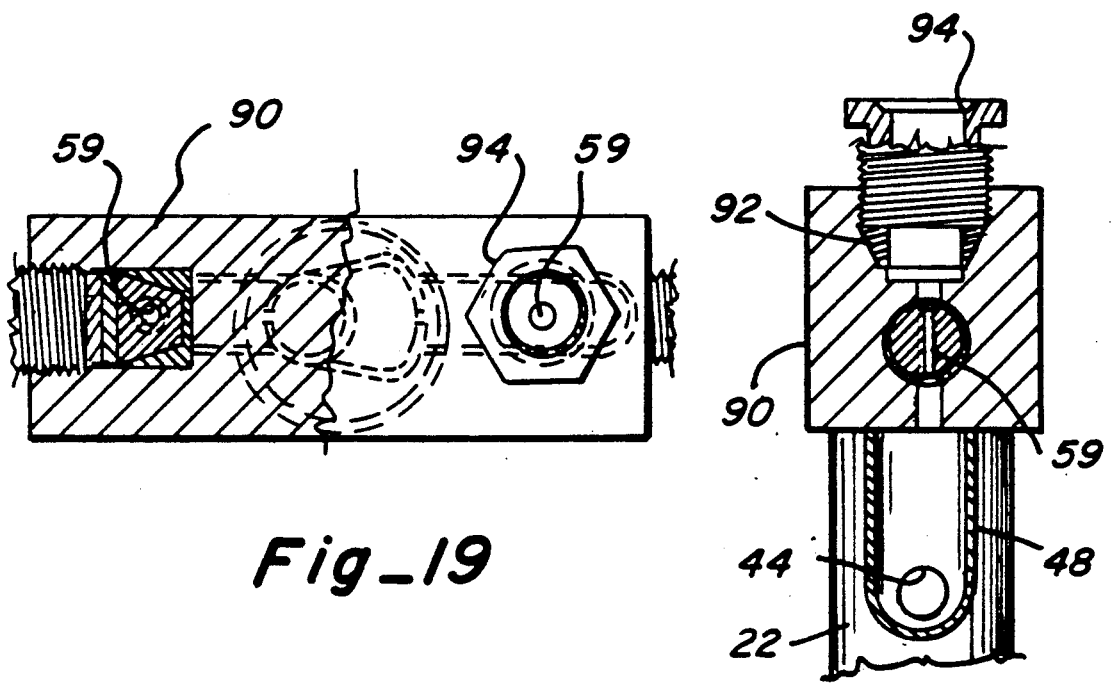
Fig_19
Fig_20

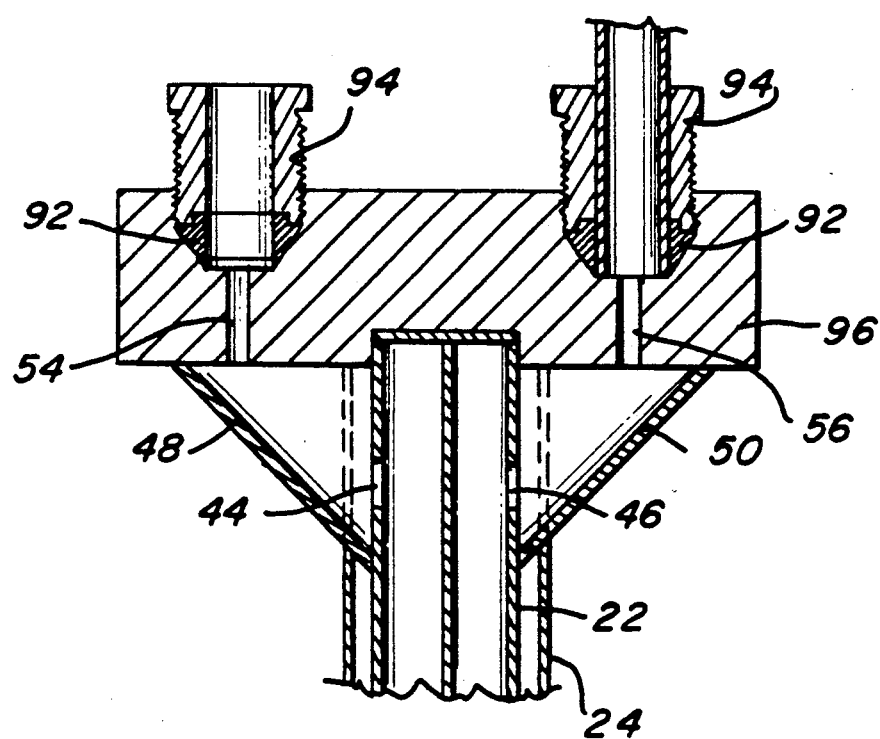
Fig_23

AVERAGING PITOT TUBE

BACKGROUND OF THE INVENTION

1. Field of the Invention

The present invention relates generally to averaging pitot tubes used as flow meters and, more particularly, to pitot tubes of the type wherein the correction factor or flow coefficient, defined as the actual flow rate divided by the theoretical flow rate, is maintained as close to constant as possible regardless of the Reynolds number produced by the fluid flow.

2. Description of the Prior Art

Measuring fluid flow in a pipe with pitot tubes or differential pressure type devices, wherein an upstream high pressure and a downstream low pressure are measured to obtain a differential pressure signal, have been known for many years. A simple plate with an orifice formed therein creates such a differential pressure, though at the cost of creating a large, permanent pressure loss and thus requiring more energy to pump the fluid at a given flow rate. The typical averaging pitot tube blocks much less of the pipe, thus producing much less of a permanent pressure loss to read the same flow rate. The averaging pitot tube also uses several holes or ports across the cross-section of the pipe to obtain the average value of the fluid velocity profile, from which the fluid flow rate can be computed. This is necessary in order to take into account a varying velocity profile due to greater frictional losses near the pipe wall.

Commercially available pitot tubes have typically been of cylindrical or diamond-shaped cross-sections. The shape of the sensing tube or probe portion of a pitot tube is important in order to minimize the effect of lift and drag forces inherent in fluid flow. Probe shape is a function of essentially two factors. On the one hand, it is desired to control the point at which boundary layer flow around the probe separates. Maintaining a constant or at least controllable separation point allows the correction factor, or flow coefficient, to remain constant so that there are less variables introduced into a flow calculation. It is an aspect of U.S. Pat. No. 4,154,100 issued to James B. Harbaugh, et al., to localize the point at which boundary layer separation occurs by creating a separation point at a sharply contoured edge at which flow separates from the probe, creating a predictable wake area in which the low pressure reading is taken.

On the other hand, it is desirable to reduce the forces on the probe due to lift, drag and vortex shedding. These vortices, caused by fluid flow from the separated boundary layer into the lower pressure wake area, tend to lock onto the resonant frequency of the probe, producing a situation of self-excitation which creates excessive vibration that, in extreme cases, can cause cracking and even breakage of the probe. Vortex shedding problems are typically associated with diamond-shaped cross sections, since the diamond produces much larger vortices.

In any event, it is a goal of many averaging pitot tubes to establish a flow coefficient which is constant over a large range of conditions in the flow. Such variable factors in the flow include fluid velocity, density and viscosity, as well as pipe diameter. All these factors are included in the Reynolds number, a dimensionless variable which relates inertial and viscous forces in fluid flow.

U.S. Pat. No. 4,154,100 to James B. Harbaugh, previously mentioned, utilizes the diamond-shaped cross-section to establish a fixed separation point for the boundary layer to stabilize the low pressure side and produce a predictable differential pressure signal. U.S. Pat. No. 4,425,807 to Michael Victor shows a cylindrical cross-section for the bluff body, as a non-aerodynamic probe is sometimes known, with a series of low pressure holes located approximately 110° from the direction of flow. Again, Victor's intent is to stabilize the low pressure signal from the probe.

German Patent No. 1,168,659 issued to A. Closterhalfen shows a truncated elliptical cross-section including a rounded nose and parallel sides. The principal inventive feature of the Closterhalfen patent is that the single upstream high pressure opening is on a different flow line from that of the single low pressure downstream opening. This is advantageous in measuring the pressure differential and from there the fluid flow only in close proximity to a pump discharge, where the fluid velocity profile is more predictable.

U.S. Pat. No. 3,355,946 issued to Robert C. Lazell shows conically-shaped interior openings in the front and rear of an averaging pitot device.

U.S. Pat. No. 1,508,017 issued to Frederick W. Greve shows an averaging pitot tube of circular cross-section. An aerodynamic shape is used in U.S. Pat. No. 1,428,780, issued to Paul Jaray, to measure velocity of flow. Forward and lateral openings give a differential pressure used to establish velocity. U.S. Pat. No. 4,304,137 issued to Richard C. Mott automatically aligns in a fluid flow to measure static pressure.

Total pressure is also measured. Another airfoil shaped device for measuring flow is seen in U.S. Pat. No. 2,522,574 issued to William H. Hagenbuch.

The prior art devices have focused on the shape of the probe or location of sensing ports to control the flow coefficient. No other means of controlling the boundary layer has been utilized. The thickness of the boundary flow layer will dictate the size of the wake and magnitude of the vortex shedding forces. The thicker the boundary layer, the greater the vortex shedding forces. None of the prior art has utilized surface roughness to help reduce the laminar boundary layer and thus the resulting vortex shedding forces.

The prior art for averaging pitot tube instrument head designs that port the high and low pressure signals (generated by the sensing tube to block valves or valve manifolds external to the pipe) includes various configurations of internal and external threaded connections. U.S. Pat. No. 4,343,195, issued to James R. Bowers and Michael Victor, shows an instrument head with flanged connections for mounting a manifold to the pitot tube without using threaded connections. Incorporating the block valves or manifold directly into the instrument head has not, heretofore, been shown.

The prior art for mounting the pitot tube in the pipe includes commercially-available flanges and compression fittings. It is desirable to bottom the probe on the opposite end of the pipe since this condition increases the structural integrity of the probe by fixing the probe at both ends. Not doing so allows all the force induced on the cantilevered probe to act on a single mounting point, which can lead to excess probe vibrations and breakage in extreme cases. While vibration and breakage can occur in the bottomed configuration of the probe, much more extreme flow conditions are required than in the cantilevered case.

U.S. Pat. No. 1,250,236, issued to Jacob M. Spitzglass, shows a compression-type fitting where a packing gland simultaneously bottoms the probe to the opposite end of the pipe and tightens the packing material to produce a fluid-tight connection. Similarly, U.S. Pat. No. 4,717,159, issued to Norman Alston, et al., shows a compression-type fitting where a packing gland simultaneously bottoms the probe to the opposite pipe wall. All prior designs, however, will require periodic readjustment because fluctuations in fluid pressure and temperature will cause the diameter of the pipe to expand and contract. While expansion and contraction of the pipe is minute, it is, nonetheless, sufficient to cause the probe to lose contact with the opposite end of the pipe in many circumstances. Incorporation of an elastic mechanism, such as a spring, which would compensate for such variation in pipe diameter, would ensure the probe would remain bottomed on the opposite wall of the pipe and would not require periodic adjustment of the packing gland.

OBJECTS AND SUMMARY OF THE INVENTION

It is the principal object of the present invention to provide an averaging pitot tube for measuring fluid flow in a pipe from differential pressure, in which the pitot tube maintains a relatively constant flow coefficient through a wide range of Reynolds numbers.

It is a related object of the present invention to provide an averaging pitot tube that mounts in the pipe by bottoming the end of the probe to the opposite end of the pipe, providing a fluid-tight connection at the packing gland and requiring no periodic adjustment due to variation of pipe diameter because of thermally-induced, pressure-induced, or mechanically-induced expansion and contraction of the pipes.

It is a related object of the present invention to provide an averaging pitot tube that is easily connected to transmitters, local indicators or other instrumentation.

In accordance with the objects of the invention, an averaging pitot tube for measuring fluid flow in a pipe includes an integral valve head connected to a bullet-shaped sensing tube or probe. A cylindrical sleeve encases the bullet-shaped sensing tube and is attached to the valve head. This sleeve extends from its attachment at the instrument head to a point slightly above the pipe wall, thus providing a round sealing surface.

The sensing tube has two separate chambers, a high pressure chamber facing upstream, toward the direction of the flow, and a low pressure chamber, facing downstream from the direction of the flow. Sensing ports are located in both the high and low pressure chambers. As the fluid impacts the probe, an average impact pressure is produced in the high pressure chamber. As the fluid passes around the sensing tube, an average suction, or low pressure, is produced in the low pressure chamber.

The sensing tube extends across the fluid flow in the pipe or conduit and is closed at the bottom end thereof. The high pressure chamber extends the length of the sensing tube to the valve head, where the high pressure fluid enters a passageway through the head. The passageway at the high pressure port of the valve head is terminated by a flanged connection, a threaded connection or a tube fitting. Likewise, the low pressure chamber extends to the instrument head and terminates with a like connection.

Integral high and low pressure valves, with valve seats machined in the valve head, are associated with the respective passageways to allow communication of the high and low pressure fluid from the chambers in the sensing tube to respective high and low pressure outlet ports of the valve head. A third valve, which opens and closes a mixing bore between the high and low pressure passages in the valve head. This third valve interconnects or isolates the high and low pressure passageway. In an alternative embodiment, two valves, one for each of the high and low pressure ports, are formed in the valve head. A tube fitting connects the head to process pressure tubing and then to the pressure measurement device. A leading edge of the surface of the high pressure tube has a roughness applied thereto by mechanical working, lamination or similar process. This roughness helps reduce laminar or boundary layer fluid flow around the sensing tube regardless of the shape of the sensing tube. The less the thickness of this laminar boundary layer, the smaller the vortices which are produced by the sensing tube, and, therefore, the less vibration and the more consistent the low pressure signal.

The sensing tube is of essentially a bullet-shaped cross-section including a divergence angle with respect to the direction of fluid flow. The divergence angle is approximately 5°. Lateral sides of the outer tube diverge slightly away from parallel according to the divergence angle. Along the lateral sides flow separation occurs. As long as separation occurs along the lateral sides, a relatively constant flow coefficient is maintained, more accurate readings of low pressure cna be obtained, thereby providing more accurate readings of differential pressure. Differential pressure is the difference between the high pressure and the low pressure. In addition, flow separation anywhere from the probe reduces the lift force associated with aerodynamic cross-sections.

BRIEF DESCRIPTION OF THE DRAWINGS

FIG. 1 is a perspective view of an averaging pitot tube of the present invention mounted in a pipe, with a measurement device mounted to an instrument head of the pitot tube.

FIG. 2 is an enlarged sectional view taken in the plane of line 2—2 of FIG. 1.

FIG. 3 is a fragmentary enlarged prospective view of a sensing tube or probe of the invention seen in FIG. 1.

FIG. 4 is an enlarged sectional view taken in the plane of line 74—4 of FIG. 2, fluid flow around the sensing tube being indicated by arrows.

FIG. 5 is an enlarged sectional view taken in the plane of line 5—5 of FIG. 1.

FIG. 6 is a sectional view taken in the plane of line 6—6 of FIG. 5.

FIG. 7 is a sectional view taken in the plane of line 7—7 of FIG. 5.

FIG. 8 is a sectional view of fluid flow around a cylindrical sensing tube.

FIG. 9 is similar to FIG. 8 with different separation point.

FIG. 10 is a sectional view of fluid flow around a diamond shaped sensing tube.

FIG. 11 is a sectional view of fluid flow around a bullet shaped sensing tube.

FIG. 12 is similar to FIG. 11.

FIG. 13 is a sectional view of a spring lock mounting system of the pitot tube.

FIG. 14 is an exploded perspective view of the spring lock mounting system shown in FIG. 13.

FIGS. 15a, b and c are schematic views showing the effect of changes in heat, pressure and shape of a pipe on the spring lock mounting system shown in FIGS. 13 and 14.

FIG. 16 is a fragmentary perspective sectional view showing an alternative embodiment of the present invention wherein a measurement device is mounted remotely from the instrument head.

FIG. 17 is a fragmentary sectional perspective view of a second alterantive embodiment of the present invention wherein the measurement device is located remotely from the instrument head and the instrument head has no valves.

FIG. 18 is an enlarged sectional view of the instrument head of the first alternative embodiment shown in FIG. 16, block valves being shown in an open position, with integral tube fittings.

FIG. 19 is sectional view taken in the plane of line 19—19 of FIG. 18.

FIG. 20 is a sectional view taken in the plane of line 20—20 of FIG. 18.

FIG. 21 is a sectional view of the instrument head of the first alternative embodiment of FIG. 16, block valves being shown in a closed position, with standard threaded connections.

FIG. 22 is a sectional view of a non-valve instrument head of the second alternative embodiment of FIG. 17, with threated connections.

FIG. 23 is a sectional view of the non-valve instrument head of the second alternative embodiment of FIG. 17 with integral tube fittings.

DESCRIPTION OF THE PREFERRED EMBODIMENT

As seen in FIG. 1, an averaging pitot tube 10 for measuring fluid flow is mounted into a pipe or conduit 14. The pitot tube 10 includes a transition 22 interconnecting an instrument or manifold head 20 and a sensing tube or probe 24 (FIG. 2). The instrument head is directly connected to a pressure measurement device 12. The sensing tube 24 extends into the pipe 14 and across the diameter thereof (FIG. 2).

The aerodynamic superiority of the bullet cross-sectional shape of the sensing tube 24 maintains a constant flow coefficient, the ratio of the actual flow to theoretically calculated fluid flow. In addition to the bullet shape, a slight divergence angle 40 of approximately 5° of lateral sides 25 of the sensing tube 24 and the utilization of leading edge surface roughness 28 (FIGS. 3 and 4) help maintain a thin laminar boundary layer flow. Separation from the boundary layer flow t turbulent flow occurs along the lateral sides 25 and as such the flow coefficient remains relatively constant. Upstream openings or ports 26 are formed along the sensing tube 24 in the direction of fluid flow 16. These upstream openings 26 receive the high pressure flow of the fluid flow 16. in a like manner, downstream openings or ports 30 are formed vertically along a trailing edge of the sensing tube 24.

The sensing tube 24 is formed by welding or otherwise conventionally connecting the high pressure outer tube 32 of a generally round cross sectional configuration to a generally u-shaped cross sectional piece of material 34 (FIG. 4). The two pieces welded together form two separate high and low pressure chambers 36 and 38 in an aerodynamic, bullet-shaped configuration. The surface roughness 28 is machined, laminated or otherwise mechanically formed onto the upstream edge of the high pressure tube 32.

Once the round, high pressure outer tue 32 is secured to the u-shaped tube 34, a bottom end 42 is closed (FIG. 2), as is a top end 52 (FIG. 5). The volume defined by the round high pressure tube 32 and th bottom end and top end 42 and 52 defines the high pressure chamber 36. In a like manner, the u-shaped piece 34, when connected to the high pressure tube 32 and closed at the bottom end 42 and the top end 52, defines the low pressure chamber 38.

The transition 22 conforms to an outer surface of the sensing tube 24 and extends from the point where the sensing tube 24 enters the pipe 14 to the manifold head 20 (FIGS. 2, 5). The transition 22 passes through a spring lock system 100 (FIGS. 13 and 14), to be described later.

A high pressure vent 44 is formed through the high pressure tube 32 (FIG. 5). A high pressure faring 48 is welded to interconnect the manifold head 20 and the high pressure tube 32. The volume defined between the high pressure tube 32 and the instrument head 20 receives the high pressure fluid from the high pressure chamber 36 through the vent 44. In a like manner, a vent 46 for low pressure fluid is formed through the low pressure tube 34. A faring 50 interconnects the valve head 20 and the low pressure tube 34 to allow low pressure fluid from the low pressure chamber 38 to enter the volume defined by the faring 50 (FIGS. 5, 6 and 7).

It is a unique aspect of the present invention that the manifold head 20 is integrally connected and formed with the sensing tube 24 to convey high and low pressure fluid to the measurement device 12, which is directly connected to the head 20 in the preferred embodiment (FIG. 1). In accomplishing this object, a high prssure passageway 54 and low pressure passageway 56 are in fluid communication wiht the volumes defined by the farings 48 and 50 respectively. High pressure fluid is thus conveyed from the high pressure chamber 36, through the vent 44 and into the passagway 54. A high pressure outlet port 55 registers with a like port (not specifically shown) on the measurement device 12, thus supplying a high pressure reading. In like manner, the low pressure passageway 56 communicates low pressure fluid from the low pressure chamber 38, through the vent 46 and to a low pressure outlet port 57. The port 57 is in fluid communication with a receivinig port in the measurement device 12, not specifically shown.

The high pressure passageway 54 can be opened or closed by a high pressure valve 58. The valve 58 is threadably connected to an integral manifold seat 62 in the valve head 20. Again, in a similar manner, the low pressure passageway 56 can be closed by low pressure valve 60 which is threadably connected to the instrument head 20 by an integral valve seat 64. (FIGS. 5, 6 and 7).

The high pressure valve 58 includes a bore 59 and a main body 61. Alignment of the bore 59 with the high pressure passageway 54 opens the high pressure side of the instrument head 20. Closing the valve rotates the bore 59 out of alignment with the high pressure passageway 54 and closes the high pressure side of the instrument head 20. The low pressure valve 60 has an identical construction and works in an identical way.

A third valve 66 is included to open and close an intermediate passageway 68 which allows communication of the high pressure fluid with the low pressure fluid (FIG. 6). The passageway 68 interconnects the high pressure and low pressure ports 55 and 57. The third valve 66 includes a bore 72 which aligns with the passageway 68 to allow fluid communication between the high pressure and low pressure sides of the manifold head 20. When the bore 72 is out of alignment, a valve body 70 blocks communication between the high pressure and low pressure sides. As was the case in the high pressure and low pressure valves 58 and 60, a threaded integral valve seat 78 is formed in the valve head 20 for connection of the third valve 66. When open, the third valve 66 equalizes pressure during pressurizing, depressurizing and checking zero of the measurement device 12.

As seen in FIGS. 6 and 7, connecting bolts 74 pass through the instrument head 20 and threadably connect to the measurement device 12 in the integral manifold configuration. O-rings 76 surround the outlet ports 55 and 57 to prevent pressure leakage between the measurement device 12 and the valve head 20.

There are four prime functions preformed by the valves 58, 60 and 66. First, when valves 58 and 60 are closed, the fluid in the pipe 14 is isolated, and the measurement device 12 can be installed or removed. Second, when valves 58 and 60 are open and 66 is closed, the pitot tube 10 is in normal operating mode. Third, when valve 66 is open and either 58 or 60 is closed, the pressure from one (high or low) reaches both ports of the measurement device 12. In this mode, the pressure to the measurement device 12 is equalized (same pressure on both high and low ports of the measurement device 12), and the measurement device 12 can be checked for zero shift. Fourth, during pressurization valve 66 is opened prior to opening either valve 58 or 60. This insures equal pressure is applied to both sides of the measurement device 12, thus preventing loss of calibration. In a similar manner, during depressurization, valve 66 is opened and 58 and 60 are closed to maintain equal pressure on both sides of the measurement device 12.

The first alternative embodiment (FIGS. 16, 18, 19, 20, 21) to the manifold head is an integral valve head 90 which incorporates only the high pressure block valve 58 and low pressure block valve 60. When block valves 58 and 60 are closed, the process fluid is isolated. When block valves 58 and 60 are open, the high and low pressure are in fluid communication with the measurement device 12. The method of attachment of the head 90 to the pitot tube 10 is as previously described. It is the unique aspect of this embodiment that the high and low pressure block valves are integrally configured in the instrument head.

The integral valve head 90 connects the pitot tube 10 to a remote measurement device 12 or a valve manifold (not shown) via threaded connections (FIG. 21) or unique integral tube fittings (FIGS. 16, 18, 19, 20). The unique aspect of the integral tube fitting is that, when a ferrule and male compression nut are integrally mounted in the integral valve head 90, they eliminate all wetted, threaded connections between the process fluid and the piping to the measurement device. This eliminates leakage due to improper thread engagement, which potentially could cause a loss of accuracy and hazardous conditions.

The integral valve head 90 with threaded connections (FIG. 21) permits the connection of various threaded components 95 (nipples, fittings, etc.) to the integral valve head 90.

The second alternative embodiment to the manifold head is a non-valve head 96 (FIGS. 17, 22 and 23). The non-valve head 96 is attached the pitot tube 10 as previously described. The head 96 connects to the remote measurement device 12 or valve manifold (not shown) via threaded connections 88 as seen in FIGS. 17 and 22 or integral tube fittings 92 and 94 as seen in FIG. 23. The function of the threaded connections and integral tube fittings are identical to those previously described.

The mounting system 100 includes a sleeve 102 which is welded or otherwise mechanically connected to the pipe 14 (FIGS. 13 and 14). A threaded packing nut 104, when turned, down past lock nut 105 into the internally threaded sleeve 102 forces a follower 106 to compress a spring 108, contoured washer or other elastic material. The opposite end of the spring 108 exerts the same force on a second follower 110, which compresses packing material 112 against a ring 114 that is welded to the transition 22. As the packing 112 is compressed, it expands outward against the sleeve 102 and inward against the transition 22, thus providing a fluid-tight connection.

Additionally, the mechanical force produced by the packing nut 104 as it compresses the packing 112 will compress the entire sensing tube 24 against the opposite wall of the pipe 14. (FIG. 13). The force exerted against the ring 114 welded to the transition 22 will force the manifold head 20, or the heads 90 and 96 of the alternative embodiment, down toward the sleeve 102. Since the sensing tube 24 is mechanically attached to the manifold head 20, it will also be forced down until it bottoms on the opposite pipe wall. After the sensing tube 24 is bottomed, further turning of the packing nut 104 will compress the spring 108 and packing 112. As the temperature and pressure of the fluid increase, the diameter of the pipe 14 will increase (FIG. 15b). As the opposite wall of the pipe 14 moves away from the bottom of the sensing tube 24, the spring 108 will expand, forcing the bottom of the sensing tube 24 to remain in contact with the opposite pipe wall. Likewise the sensing tube 24 will remain in contact with the opposite pipe wall if thermal contraction occurs (FIG. 15a) or mechanical distortion occurs (FIG. 15c). When the sensing tube 24 is bottomed and the packing material 112 is compressed sufficiently, providing a fluid-tight seal, the lock nut 105 is snugged against the sleeve 102 to prevent the packing nut 104 from moving or backing out.

The advantages of the shape of present invention over the prior art are seen in FIGS. 8-12. FIGS. 8 and 9 show fluid flow about a cylindrical probe. The disadvantage of a cylindrical probe is the inability to control the location of the separation of boundary layer from the probe flow. As seen in FIG. 8, separation occurs approximately at 0° and 180°. FIG. 9, on the other hand, having a different Reynolds number including different velocities, densities and viscosities of the fluid, has a different separation point at approximately 45° and 135° on the circular cross section of the sensing probe.

Diamond-shaped cross-sections force separation at a pre-established contoured edge as seen in FIG. 10. However, the poor aerodynamics of a diamond shaped probe result in excessive vortex shedding and increased aerodynamic stress on the probe. This forced vortex shedding causes excessive aerodynamic forces to impact the diamond-shaped probe of FIG. 10. Continual buffeting by these forces can cause cracking and even breakage of the probe.

In contrast, the bullet shape of the probe of the present invention (FIGS. 11 and 12), with its slightly diverging lateral sides 25 and leading edge surface roughness 28, maintains an aerodynamic profile, while minimizing the effects of vortex shedding. A constant flow coefficient is maintained because separation always occurs along the lateral sides 25.

Although the present invention has been described with a certain degree of particularity, it is understood that the present disclosure has been made by way of example, and changes in detail or structure may be made without departing from the spirit of the invention, as defined in the appended claims.

What is claimed is:

1. In an averaging pitot tube for measuring high pressure and low pressure in a fluid flowing in a closed conduit, said pitot tube including a probe insertable into said conduit having an upstream surface and a downstream surface each of which has a plurality of holes formed along the length thereof for measuring respectively high pressure and low pressure, the improvement comprising:

a cross-section of said probe including an essentially rounded upstream surface and slightly angularly diverging lateral side surfaces interconnected by a rear surface, said rounded surface including a roughened area of pre determined size.

2. The invention as defined in claim 1 further including:

a mounting system, which provides a fluid-tight connection and maintains the probe in contact with an opposite wall of the conduit regardless of changes in conduit diameter due to changes in pressure, temperature or mechanical force.

3. The invention as defined in claim 1 wherein said side surfaces define an angle of approximately 5° with a longitudinal centerline of the probe.

4. An averaging pitot tube measuring a high pressure and a low pressure in a closed conduit having fluid flowing therealong in a predetermined direction, comprising in combination:

an instrument head integrally connected to a probe, which probe is insertable into said conduit and extends across the fluid flow in said conduit, said probe including a rounded, roughened, upstream surface to minimize the thickness of boundary layer fluid flow, said probe further including slightly diverging lateral sides, a plurality of holes formed along the length of the rounded surface, a downstream surface of said probe located in a low pressure zone of the fluid flow, said downstream surface including similar holes formed along the length thereof, said probe including a high pressure chamber and a low pressure chamber in fluid communication with passageways formed in said head, said passageways in head in fluid communication with measurement devices connectable to said head.

5. The invention as defined in claim 4 wherein said probe further includes a tube of a generally round-shaped cross section facing the direction of fluid flow defining the high pressure chamber, and a generally "u" shaped tube attached to the back of the round tube defining the low pressure chamber.

6. An averaging pitot tube for connection to a fluid conduit to measure an upstream high pressure and a downstream low pressure, comprising in combination:

a head integrally connected to said probe, said probe having openings formed on a rounded, upstream surface, said upstream surface roughened over a predetermined area and having openings formed therethrough associated with high pressure measurements and a downstream surface of said probe associated with a low pressure measurement, angularly divergent lateral side surfaces interconnecting said upstream and downstream surfaces to maintain a constant flow coefficient, said openings providing fluid communication with a high pressure chamber and a low pressure chamber, respectively, in said probe, said head providing fluid flow communication between said high and low pressure chambers by means of high and low pressure passageways which are selectively opened and closed by high pressure and low pressure valves, outlet ports of said head registering with and in fluid communication with inlet ports of a measurement device, which is selectively connected to said head, whereby said measurement device is connected to said pitot tube for fluid flow measurements.

7. In an averaging pitot tube for measuring high pressure and low pressure in a fluid flowing in a closed conduit, said pitot tube including a probe insertable into said conduit, an upstream surface and a downstream surface of said probe, each having a plurality of holes formed along the length thereof for measuring high pressure and low pressure, respectively, the improvement comprising:

a mounting system including a tubular sleeve to receive said probe, a ring mounted on said probe, a spring coaxial about said probe and abutting at one end a follower and packing material, which packing material is mounted on said ring, a packing nut threadably received by said sleeve abutting a second end of said spring through a second follower and a lock nut to secure the position of said mounting system, whereby said mounting system provides a fluid-tight connection and maintains the probe in contact with an opposite wall of the conduit, regardless of changes in conduit diameter due to changes in pressure, temperature or mechanical force.

8. An averaging pitot tube for measuring a high pressure and a low pressure in a closed conduit having fluid flowing therealong in a predetermined direction, comprising in combination:

an instrument head integrally connected to a probe, which probe is insertable into said conduit and extends across the fluid flow in said conduit, said probe including a roughened and rounded upstream surface to minimize thickness of boundary layer fluid flow, and slightly diverging lateral sides, said roughened and rounded surface including a plurality of holes formed along the length thereof, said probe further including a downstream surface in a low pressure zone of the fluid flow, said downstream surface including similar holes formed along the length thereof, said probe including a high pressure chamber and a low pressure chamber fluid communication with passageways formed in said head, said passageways in said head in fluid communication with measurement devices selectively connectable to said head.

9. The invention as defined in claim 8 wherein said head further includes high and low pressure passageways associated with each of said high pressure and low pressure chambers, said passageway selectively closed and opened by first and second valves.

10. The invention as defined in claim 9 further including an intermediate passageway formed in said head, said intermediate passageway selectively opened and closed by a third valve, to thereby provide fluid communication between the high pressure passageway and the low pressure passageway.

11. The invention as defined in claim 8 wherein said probe further includes a tube of generally round shaped cross-section facing the direction of fluid flow defining the high pressure chamber and a generally U-shaped tube attached to the back of the round tube defining the low pressure chamber.

12. The invention as defined in claim 8 wherein a vent is formed through said probe for each of said high and low pressure chambers, and a faring interconnecting said instrument head forming a volume into which high pressure and low pressure fluids respectively pass through said vent and into said passageways, a transition sleeve fitting around said probe, said transition fixedly connected to said head and said faring and extending to a wall of said conduit.

13. An averaging pitot tube for connection to a fluid conduit to measure an upstream high pressure and a downstream low pressure, comprising in combination:
a head integrally connected to said probe, said probe having openings formed in an upstream surface thereof associated with a high pressure measurement and openings formed in a downstream surface thereof associated with a low pressure measurement, said openings providing fluid communication with a high pressure chamber and a low pressure chamber in said probe, said head providing fluid flow communication between said high and low pressure chambers by means of high and low pressure passageways which are selectively opened and closed by high pressure and low pressure valves, outlet ports of said head register with and are in fluid communications with inlet ports of a measurement device selectively connected to said head, said probe further including a rounded upstream surface and angularly divergent lateral side surfaces and a rear surface, whereby boundary layer flow occurs around said probe and separates from said probe along said lateral side surfaces to thereby maintain a constant flow coefficient.

14. The invention as defined in claim 13 wherein said rounded front surface of said probe is roughed over a predetermined area.

* * * * *